Oct. 19, 1954
W. L. L. WYNNE
2,692,360
MOTOR SPEED MATCHING CONTROL
Filed June 24, 1952
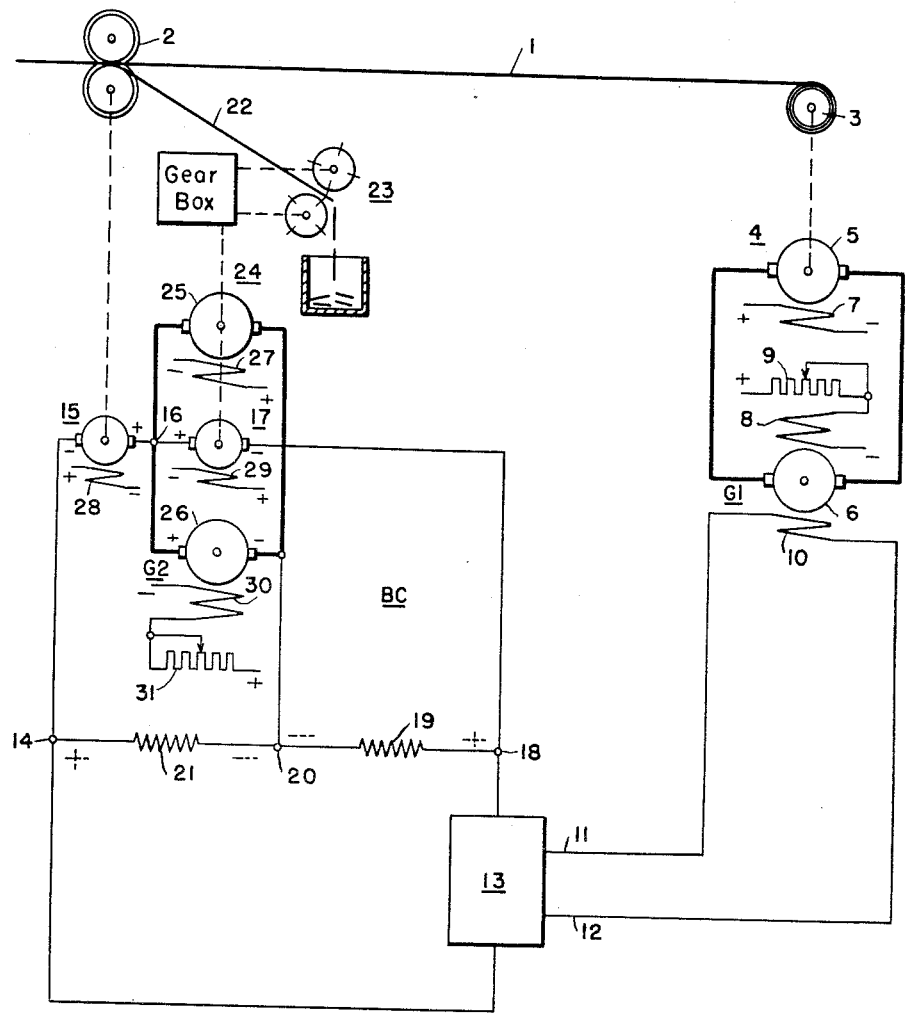
WITNESSES:
E.O. McCloskey.
Wm. B. Sellers.
INVENTOR
Walter L.L. Wynne.
BY
Paul E. Friedemann
ATTORNEY

Patented Oct. 19, 1954

2,692,360

UNITED STATES PATENT OFFICE 2,692,360

MOTOR SPEED MATCHING CONTROL

Walter Lewis Lifton Wynne, Stafford, England, assignor to The English Electric Company Limited, London, England, a British company Application June 24, 1952, Serial No. 295,280

Claims priority, application Great Britain July 6, 1951

7 Claims. (Cl. 318—71)

This invention relates to control systems for dynamo-electric machines and, more particularly, to systems of control for maintaining a selected speed relation between two direct-current motors driving a load.

This invention is concerned with the speed control of two direct-current motors, namely, to maintain a predetermined speed relationship of the two motors by controlling one motor or both motors in accordance with the resultant output voltage of two direct-current tachometer-generators connected in series opposition, one being driven by one motor and the other being driven by the other motor.

One disadvantage of the system broadly described in the preceding paragraph is that when the resultant output voltage of the two tachometer-generators reverses so that the current in the output circuit reverses in direction, the voltage drop in the brushes of the tachometer-generators changes abruptly from an appreciable value in one sense to the equivalent value in the opposite sense. This causes a discontinuity in the linear relationship between the current in the output circuit of the tachometer-generators and the resultant output voltage of these generators. Furthermore, at small values of out-of-balance of the tachometer-generator outputs, there is insufficient voltage to produce a control current in the output circuit.

It is a broad object of this invention to substantially eliminate the mentioned disadvantages.

Another broad object of this invention is the provision of a biasing current, in the circuit connection of two tachometer-generators connected in series opposition, of a magnitude to prevent reversal of the net current through the tachometer-generators, at least over a desired predetermined range of speed.

The objects expressed are merely illustrative. Still other objects and advantages will become more apparent from a study of the following specification and the accompanying drawing, in which the single figure is a diagrammatic showing of the invention as applied to a slitter and winder drive.

Referring now to the drawing, 1 designates a strip of steel or other material that is being pulled through the slitter 2 by the winding reel 3 driven in a clockwise direction by the motor 4.

The armature winding 5 of the motor 4 is connected in a loop circuit, as shown, with the armature winding 6 of the variable voltage supply generator G1. For the purpose of this disclosure, the excitation of the motor field 7 may be considered constant, the generator speed to be constant and the operating voltage, or reference voltage of the generator G1 to be selected by a proper fixed, or if desired, changing adjustment of the excitation of the generator field 8 by the rheostat 9. The motor 4 is thus supplied on the Ward-Leonard principle from the variable voltage generator G1.

The control component of the voltage of generator G1 is provided by the field winding 10 connected to the output terminals 11 and 12 of the amplifier 13.

The input of the amplifier 13 is obtained from the output terminals, or junctions, 14 and 18, of the bridge circuit BC. The bridge circuit BC includes the tachometer-generator 15 in the first leg, the tachometer-generator 17 in the second leg, the impedance 19 in the third leg, and the impedance 20 in the fourth leg.

The tachometer generator 15 is mechanically coupled to the slitter 2. Since the slitter is of the pull-through type, the slitter operates as a function of the strip speed and in consequence the voltage output of the tachometer-generator 15 is a function of the strip speed. Preferably, the voltage output of tachometer-generator 15 is proportional to strip speed.

The slitter 2 cuts the edges off the strip 1 and these edges 22 are fed to the scrap cutter 23 driven by the direct-current motor 24. The scrap cutter cuts the scrap strips 22 in short lengths for reception of the pieces in a container C for ease of handling. The armature winding 25 of the motor 24 is connected in a loop circuit with the armature winding 26 of the variable voltage generator G2. The motor 24 is thus supplied on the Ward-Leonard principle from the variable voltage generator G2.

For the purposes of this disclosure, the assumption may be made that the field windings 27, 28 and 29 of the motor 24 and the two tachometer-generators 15 and 17, respectively, are energized at a constant value. The generator G2 may either be driven by a suitable motor at a constant speed or be coupled to be driven at a speed corresponding to the speed of the slitter 2, or the cutter 23 when such speed control of the generator G2 may be desirable.

Since no driving motor for generator G2 is shown, let the assumption be that the generator speed is constant. The voltage of the generator G2 will thus be a function of the excitation of the field winding 30 as adjusted by the rheostat 31. The rheostat adjustment may be fixed at any selected value or may follow some variable function depending on requirements for the control system not forming part of this invention.

The linear speed of the strip 1 is maintained at a predetermined relationship to the speed of the scrap cutter 23 by means of the two direct-current tachometer-generators 15 and 17 driven from the motor 4 and from the slitter 2, respectitively.

The two tachometer-generators have their field windings 28 and 29 connected to some suitable source and thus are separately excited from a substantially constant voltage source. The motor 24 and the generator G2 have their respective field windings 28 and 30 connected to a constant voltage source, not shown. To provide for variable voltage, the field winding 30 is provided with the rheostat 31.

Since the tachometer-generators 15 and 17 are connected in series opposition, only the net voltage output is supplied to the junctions 14 and 18, namely to the input terminals of the amplifier 13 controlling the excitation of the control field winding 10 of the generator G1. This field winding 10 is arranged so that any deviation of the two tachometer-generator outputs from a predetermined ratio results in the excitation of the generator G1, and thus the linear speed of the strip, being varied in a corrective sense.

As so far described, except for an unexplained mention thus far made of generator G2 and the impedances 19 and 21, the system suffers from the disadvantages previously referred to; that is to say, there will be a discontinuity in the relationship between the out-of-balance voltage of the two tachometer-generators and the control current, and at small values of out-of balance no control current will flow through the circuit including the armatures of the tachometer-generators. These disadvantages are, however, overcome in the embodiment described, by connecting the two impedances, preferably resistors, 19 and 21, in series across the outer terminals of the tachometer-generators so as to form the bridge circuit BC, having the input terminals of the amplifier 13 connected to junctions 14 and 18, and having the output terminals of the generator G2 connected to the junctions 16 and 20.

The polarities of the tachometer-generators 15 and 17 and of the generator G2 are as indicated in the drawing. From the showing, it will be seen that a voltage will be applied to each tachometer-generator of a polarity opposite to its own output polarity. A biasing current will accordingly flow through each tachometer-generator which will overcome the voltage drop effect of the brushes and in consequence a substantially linear relationship will be maintained between the unbalance output voltage and the control current flowing in the circuit.

The generator G2 will cause a current to flow from its positive terminal to junction 16, the tachometer-generator 15, the resistor 21, junction 20 to the negative generator terminal, and current will also flow from junction 16 through the tachometer-generator 17, resistor 19 to the negative junction 20. Since the voltage of generator G2 is, even for its low voltage outputs, chosen to swamp the respective voltages of the tachometer-generators, the current flow will always be as indicated. The result is that junctions 14 and 18 are always positive with respect to junction 20. The direction of the control current flow to the amplifier 13 is, however, determined by whichever tachometer-generator has the greater voltage output even though the current in the tachometer generator armatures never reverses. When junction 14 is more positive than junction 18, the control current through the input circuit of the amplifier is from junction 14 to junction 18. When junction 18 is more positive than the junction 14, the control current to the amplifier is reversed.

Furthermore, since the bridge circuit BC is supplied, at junctions 16 and 20, from the variable voltage generator G2, any adjustment, by the adjustment of rheostat 31, of the output voltage of this generator G2 to vary the speed of the motor 24 will result in an automatic adjustment of the biasing current and reversal of the net current through each tachometer-generator will be prevented at all speeds of operation.

From the showing made and the preceding discussions, it will be apparent that the voltage of the source, namely the generator G2, is preferably arranged to vary directly with the speed of one of the motors so as to insure that whatever the speed of the motor 24 there will always be a sufficient biasing current through the tachometer generators to prevent reversal of the net current, the control current supplied to the amplifier. Where, however, the motors are to be operated within a limited speed range, the voltage of the generator G2 may be selected to be constant.

It will be appreciated that, for best results, the resistance values of the resistors 19 and 21 must be chosen with care relative to the circuit parameters. For example, too low a resistance value of the resistors 19 and 21 would result in too much control current by-passing the amplifier 13 through the two resistors, while too high a value of the resistances of the two resistors would not allow sufficient biasing current to flow through the tachometer generators to prevent reversal of the control current.

I claim as my invention:

1. In a system of control, in combination, a motor and variable voltage generator connected in a loop circuit with said motor to supply electric energy to the motor, a second motor and second variable voltage generator connected in a second loop circuit to supply electric energy to the second motor, a first tachometer-generator coupled to be driven as a function of the speed of the first motor, a second tachometer-generator coupled to be driven as a function of the speed of the second motor, said tachometer-generators being connected in series opposition, circuit means for interconnecting one of the variable voltage generators with the tachometer generators to prevent reversal of the current flow through the tachometer-generators regardless of which one of the tachometer-generators has the greater voltage output, and circuit means for changing the excitation of one of the variable voltage generators as a function of the resultant voltage output of the tachometer generators.

2. In an electric system of control, in combination, a first direct-current motor and a first variable voltage generator connected in a first loop circuit with each other, whereby the first motor is supplied with electric energy from the first variable voltage generator, a second direct-current motor and a second variable voltage generator connected in a second loop circuit with each other, whereby the second motor is supplied with electric energy from the second variable voltage generator, a first tachometer-generator, having armature windings and field windings, coupled to produce a voltage proportional to the speed of the first motor, a second tachometer-generator, having armature windings and field windings, coupled to produce a voltage proportional to the speed of the second motor, a pair of resistors, a bridge circuit including the armature windings of the two tachometer generators in two adjacent legs and the two resistors in the two other adjacent legs, said tachometer-generators being connected in series opposition, circuit means for connecting one of said variable voltage generators across the junctions of the bridge circuit disposed between the tachometer-generators and the resistors, respectively, said variable voltage generator connected to the bridge circuit being so connected and energized as to be in swamping opposed voltage relation to said tachometer-generators, and means responsive to the sign and magnitude of the voltage differential across the other two junctions of said bridge circuit for controlling the excitation of the variable voltage generator not connected to the bridge circuit.

3. In an electric system of control, in combination, a direct-current motor and a variable voltage generator connected in a loop circuit with the motor to thus supply electric energy to the motor, a second direct-current motor and second variable voltage generator connected in a second loop circuit with the second motor to thus supply electric energy to the second motor, a tachometer-generator coupled to produce a voltage output as a function of the speed of the first motor, a second tachometer-generator coupled to produce a voltage output as a function of the speed of the second motor, a pair of impedances, a loop circuit including the first tachometer-generator, the second tachometer-generator, connected in voltage opposition to the first tachometer-generator, the first impedance and the second impedance in the order named, circuit means for connecting a swamping voltage in voltage opposition to the tachometer-generators across the junction between the tachometer-generators and the junction between the two impedances, and control means for controlling the voltage of one of said variable voltage generators as a function of the voltage output appearing across the junctions between one tachometer-generator and one impedance and the junction between the other impedance and the second tachometer-generator.

4. In an electric system of control, in combination, a direct-current motor and a variable voltage generator connected in a loop circuit with the motor to thus supply electric energy to the motor, a second direct-current motor and second variable voltage generator connected in a second loop circuit with the second motor to thus supply electric energy to the second motor, a tachometer-generator coupled to produce a voltage output as a function of the speed of the first motor, a second tachometer-generator coupled to produce a voltage output as a function of the speed of the second motor, a pair of impedances, a loop circuit including the first tachometer-generator, the second tachometer-generator, connected in voltage opposition to the first tachometer-generator, the first impedance and the second impedance in the order named, circuit means for connecting a swamping voltage in voltage opposition to the tachometer-generators across the junction between the tachometer-generators and the junction between the two impedances, and control means for controlling the voltage of one of the variable voltage generators, said control means including an amplifier having its input terminals connected across the junction between one tachometer-generator and one impedance and the junction of the other tachometer-generator and the other impedance, and a control field winding connected to the output terminals of the amplifier.

5. In an electric system of control, in combination, a motor, a tachometer-generator coupled to the motor and thus having an output voltage that is a function of the motor speed, a second motor and second tachometer-generator coupled to the second motor to thus have an output voltage that is a function of the speed of the second motor, two impedances, a bridge circuit including the tachometer-generators, connected in series opposition, in two adjacent legs of the bridge circuit and the impedances connected in the other two adjacent legs of the bridge circuit, circuit means connected across the junction between the tachometer-generators and the junction between the impedances and energized to be in swamping voltage opposition to the voltages of the tachometer generators, and means for varying the speed of one of said motors as a function of the voltage appearing at the junctions between one tachometer generator and one impedance and the other tachometer-generator and the other impedance.

6. In an electric system of control, in combination, a motor, a tachometer-generator coupled to the motor and thus having an output voltage that is a function of the motor speed, a second motor and second tachometer-generator coupled to the second motor to thus have an output voltage that is a function of the speed of the second motor, two impedances, a bridge circuit including the tachometer-generators, connected in series opposition, in two adjacent legs of the bridge circuit and the impedances connected in the other two adjacent legs of the bridge circuit, a variable voltage generator having main field windings and control field windings connected to energize one of said motors, a second variable voltage generator connected to energize the other of said motors, circuit means for connecting one of the variable voltage generators across the junction between the tachometer-generators and the junction between the impedances, the connection being so made that the variable voltage generator is in voltage opposition to the tachometer generators, and circuit means for interconnecting the control field windings with the other two junctions of the bridge circuit, whereby the voltage output of the variable voltage generator with the control field winding is altered to change the speed of the motor connected to this said variable voltage generator.

7. In an electrical control system, the combination of a first motor and a first variable voltage generator connected in loop circuit, a second motor and a second variable voltage generator connected in loop circuit, excitation means for said first and second variable voltage generators, and means for maintaining a given relationship of speeds of said first and second motors comprising; a first tachometer-generator driven at a speed which is a function of the speed of said first motor, a second tachometer-generator driven at a speed which is a function of said second motor, a common terminal for said first and second tachometer-generators so that they are connected in series opposition, impedance means connected across the remaining terminals of said first and second tachometer-generators, circuit means for connecting the first variable voltage generator between the common terminal for the tachometer-generators and an intermediate point on said impedance means, and circuit means for connecting excitation means for said second variable voltage generator across said impedance means to be excited in accordance with the voltage across it.

References Cited in the file of this patent

UNITED STATES PATENTS

| Number | Name | Date |
|---|---|---|
| 2,298,877 | Edwards et al. | Oct. 13, 1942 |
| 2,443,048 | McComb | June 8, 1948 |